US008668478B2

(12) United States Patent
Su et al.

(10) Patent No.: US 8,668,478 B2
(45) Date of Patent: Mar. 11, 2014

(54) COMPRESSOR HAVING A SHUTDOWN VALVE

(75) Inventors: Xiaogeng Su, Suzhou (CN); Weihua Guo, Suzhou (CN); Hanqing Zhu, Suzhou (CN); Xiaomin Qu, Shanghai (CN)

(73) Assignee: Emerson Climate Technologies, Inc., Sidney, OH (US)

( * ) Notice: Subject to any disclaimer, the term of this patent is extended or adjusted under 35 U.S.C. 154(b) by 199 days.

(21) Appl. No.: 13/155,021

(22) Filed: Jun. 7, 2011

(65) Prior Publication Data

US 2011/0236242 A1 Sep. 29, 2011

Related U.S. Application Data

(63) Continuation of application No. 12/207,089, filed on Sep. 9, 2008, now Pat. No. 7,959,421.

(60) Provisional application No. 61/038,162, filed on Mar. 20, 2008, provisional application No. 60/993,451, filed on Sep. 11, 2007, provisional application No. 60/993,452, filed on Sep. 11, 2007, provisional application No. 60/993,464, filed on Sep. 11, 2007, provisional application No. 60/993,465, filed on Sep. 11, 2007.

(51) Int. Cl.
*F01C 1/02* (2006.01)
*F03C 2/00* (2006.01)
*F03C 4/00* (2006.01)

(52) U.S. Cl.
USPC ........... 418/55.1; 418/55.5; 418/57; 418/270; 137/515.7; 137/855; 137/856

(58) Field of Classification Search
USPC ............... 418/55.1–55.6, 57, 207; 137/515.7, 137/855, 856
See application file for complete search history.

(56) References Cited

U.S. PATENT DOCUMENTS

| 4,877,382 A | 10/1989 | Caillat et al. |
| 4,911,620 A | 3/1990 | Richardson, Jr. et al. |

(Continued)

FOREIGN PATENT DOCUMENTS

| CN | 1103932 | 6/1995 |
| CN | 1196776 | 10/1998 |

(Continued)

OTHER PUBLICATIONS

International Preliminary Report on Patentability regarding International Application No. PCT/US2008/010604 dated Mar. 16, 2010.

(Continued)

*Primary Examiner* — Theresa Trieu
(74) *Attorney, Agent, or Firm* — Harness, Dickey & Pierce, P.L.C.

(57) ABSTRACT

A scroll compressor includes a discharge valve assembly having a valve member, a valve stop supported within the compressor shell and including an aperture there through and a communication member. The communication member defines a fluid passage extending into the discharge chamber from the valve stop toward the first discharge outlet in the discharge chamber and provides fluid communication between the aperture in the valve stop and a location downstream of the valve stop. A first side of the valve member abuts the valve stop when in an open position and the valve stop provides communication between the first side of the valve member and the communication member via the aperture.

15 Claims, 6 Drawing Sheets

(56) References Cited

U.S. PATENT DOCUMENTS

| | | | |
|---|---|---|---|
| 5,080,566 A | 1/1992 | Sakata et al. | |
| 5,188,520 A | 2/1993 | Nakamura et al. | |
| 5,215,451 A | 6/1993 | Hara et al. | |
| 5,241,495 A | 8/1993 | Sasaki | |
| 5,280,230 A | 1/1994 | Mahoney | |
| 5,407,335 A | 4/1995 | Caillat et al. | |
| 5,411,384 A | 5/1995 | Bass et al. | |
| 5,462,418 A | 10/1995 | Shimizu et al. | |
| 5,470,213 A | 11/1995 | Iguchi et al. | |
| 5,478,223 A | 12/1995 | Yamamoto et al. | |
| 5,487,653 A | 1/1996 | Lee | |
| 5,494,422 A * | 2/1996 | Ukai et al. | 418/55.1 |
| 5,511,959 A | 4/1996 | Tojo et al. | |
| 5,527,166 A | 6/1996 | Chang et al. | |
| 5,863,191 A | 1/1999 | Motegi et al. | |
| 5,897,306 A | 4/1999 | Beck | |
| 6,017,203 A | 1/2000 | Sugawa et al. | |
| 6,056,524 A | 5/2000 | Williams et al. | |
| 6,113,373 A | 9/2000 | Fukuhara et al. | |
| 6,142,754 A | 11/2000 | Hsiao et al. | |
| 6,193,485 B1 | 2/2001 | Ueda et al. | |
| 6,241,495 B1 | 6/2001 | Chang | |
| 6,307,356 B1 | 10/2001 | Dwelley | |
| 6,419,457 B1 | 7/2002 | Seibel et al. | |
| 6,494,688 B1 | 12/2002 | Barito et al. | |
| 6,537,044 B2 | 3/2003 | Chang et al. | |
| 6,679,683 B2 | 1/2004 | Seibel et al. | |
| 6,884,046 B2 | 4/2005 | Matsukawa et al. | |
| 6,896,497 B2 | 5/2005 | Kuo | |
| 6,953,330 B1 | 10/2005 | Muto | |
| 6,984,115 B1 | 1/2006 | Tarng et al. | |
| 7,074,013 B2 | 7/2006 | Seibel et al. | |
| 7,140,851 B2 | 11/2006 | Tarng | |
| 7,553,140 B2 | 6/2009 | Stover | |
| 7,585,164 B2 * | 9/2009 | Joo et al. | 418/55.1 |
| 7,914,268 B2 | 3/2011 | Su | |
| 7,959,421 B2 * | 6/2011 | Su et al. | 418/55.1 |
| 2005/0201883 A1 | 9/2005 | Clendenin et al. | |
| 2006/0198748 A1 | 9/2006 | Grassbaugh et al. | |
| 2006/0204379 A1 | 9/2006 | Seibel et al. | |
| 2006/0204380 A1 | 9/2006 | Seibel et al. | |
| 2006/0245968 A1 | 11/2006 | Gopinathan et al. | |
| 2007/0134117 A1 | 6/2007 | Liang et al. | |

FOREIGN PATENT DOCUMENTS

| | | | | |
|---|---|---|---|---|
| CN | 1197892 | | 11/1998 | |
| CN | 1349053 | | 5/2002 | |
| JP | 01130082 A | * | 5/1989 | 418/55.1 |
| JP | 06241178 A | * | 8/1994 | 418/55.1 |
| JP | 09317667 A | * | 12/1997 | F04C 18/02 |

OTHER PUBLICATIONS

International Preliminary Report on Patentability regarding International Application No. PCT/US2008/010623 dated Mar. 16, 2010.
Second Office Action from the State Intellectual Property Office for People's Republic of China regarding Chinese Patent Application No. 200880106347.7, dated Aug. 30, 2012. Translation provided by Unitalen Attorneys at Law.
First Chinese Office Action regarding Application No. 200880106327.X, dated Nov. 10, 2011. Translation provided by Unitalen Attorneys at Law.
U.S. Office Action regarding U.S. Appl. No. 12/207,072, dated Feb. 4, 2011.
U.S. Office Action regarding U.S. Appl. No. 12/207,072, mailed Jul. 13, 2011.
U.S. Office Action regarding U.S. Appl. No. 12/207,072, mailed Feb. 17, 2012.
U.S. Final Office Action regarding U.S. Appl. No. 12/207,072, mailed Jul. 2, 2012.
U.S. Notice of Allowance regarding U.S. Appl. No. 12/207,072, mailed Aug. 22, 2012.
First Chinese Office Action regarding Application No. 200880115902.2, dated Dec. 1, 2011. Translation provided by Unitalen Attorneys at Law.
Second Chinese Office Action regarding Application No. 2008801159022, dated May 15, 2012. Translation provided by Unitalen Attorneys at Law.
First Chinese Office Action regarding Application No. 200880106340.5, dated Feb. 24, 2012. Partial translation provided by Unitalen Attorneys at Law.
U.S. Office Action regarding U.S. Appl. No. 12/207,051, mailed Feb. 9, 2011.
U.S. Notice of Allowance regarding U.S. Appl. No. 12/207,051, mailed Jul. 15, 2011.
U.S. Notice of Allowance regarding U.S. Appl. No. 12/207,036, mailed Dec. 9, 2010.
First Chinese Office Action regarding Application No. 200880106311.9, dated Dec. 9, 2011. Summary provided by Unitalen Attorneys at Law.
U.S. Office Action regarding U.S. Appl. No. 12/207,016, mailed Jan. 31, 2011.
U.S. Notice of Allowance regarding U.S. Appl. No. 12/207,016, mailed Jul. 11, 2011.
First Chinese Office Action regarding Application No. 200880106347.7, dated Dec. 13, 2011. Translation provided by Unitalen Attorneys at Law.
U.S. Notice of Allowance regarding U.S. Appl. No. 12/207,089, mailed Feb. 3, 2011.
International Preliminary Report on Patentability regarding International Application No. PCT/US2008/010597, dated Mar. 16, 2010.
International Preliminary Report on Patentability regarding International Application No. PCT/US2008/010622, dated Mar. 16, 2010.

* cited by examiner

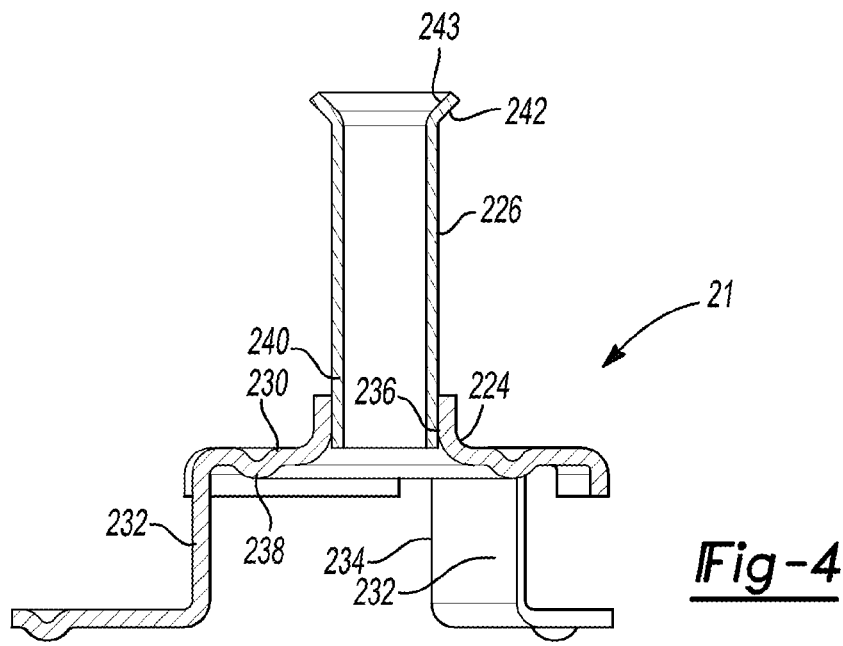
*Fig-4*
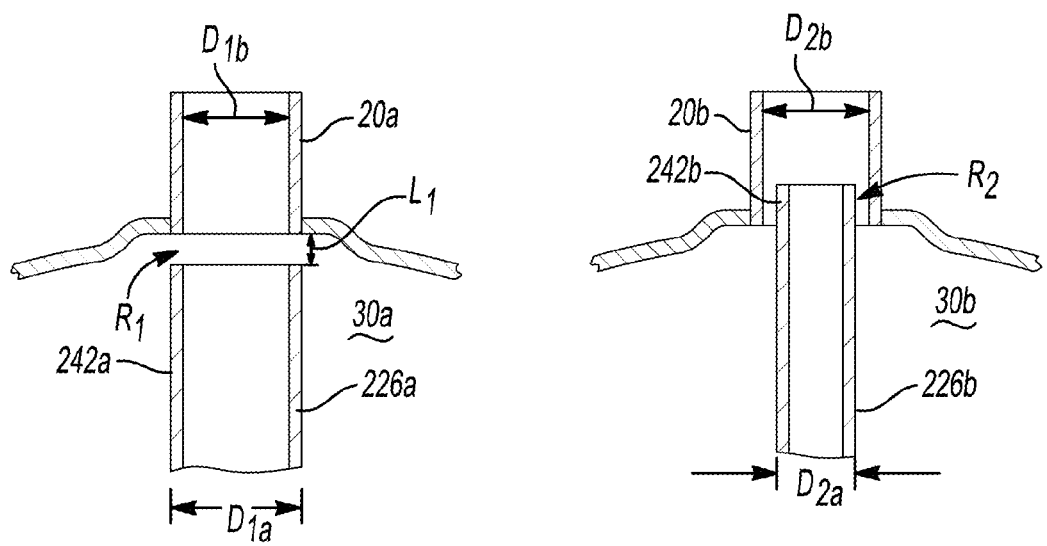
*Fig-5*  *Fig-6*
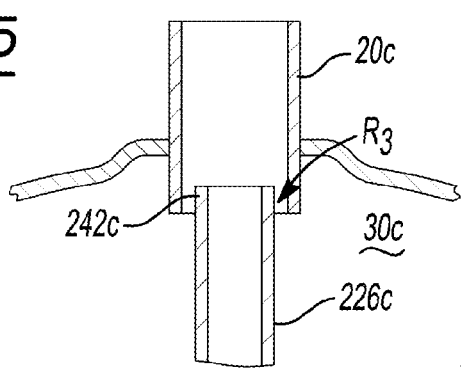
*Fig-7*

COMPRESSOR HAVING A SHUTDOWN VALVE

CROSS-REFERENCE TO RELATED APPLICATIONS

This application is a continuation of U.S. patent application Ser. No. 12/207,089 filed on Sep. 9, 2008 which claims the benefit of U.S. Provisional Application Nos. 60/993,451, 60/993,452, 60/993,464 and 60/993,465, each filed on Sep. 11, 2007 and U.S. Provisional Application No. 61/038,162, filed Mar. 20, 2008. The entire disclosure of each of the above applications is incorporated herein by reference.

FIELD

The present disclosure relates to compressors, and more specifically to backflow prevention devices in compressors.

BACKGROUND

This section provides background information related to the present disclosure which is not necessarily prior art.

During scroll compressor operation, a gas is pressurized by compression due to orbital travel of the scroll members. During compressor shutdown, the pressurized gas has a tendency to backflow to a lower pressure region and causes a reverse orbit of the scroll members. Scroll compressors may include a valve assembly to prevent a reverse rotation of the scroll members during shutdown. However, even with the valve assemblies, some reverse orbit may occur due to delays in valve closing.

SUMMARY

This section provides a general summary of the disclosure, and is not a comprehensive disclosure of its full scope or all of its features.

A scroll compressor may include a shell, a partition, a first scroll member, a second scroll member, a drive member and a discharge valve assembly. The shell may include a suction pressure region and a discharge chamber having a discharge outlet. The partition may be coupled to the shell and may separate the suction pressure region from the discharge chamber. The first scroll member may be supported within the suction pressure region of the shell and may include a second discharge outlet in communication with the discharge chamber. The second scroll member may be meshingly engaged with the first scroll member and the drive member may be engaged with the second scroll member. The discharge valve assembly may include a valve member, a valve stop supported within the shell and including an aperture therethrough and a communication member. The communication member may define a fluid passage extending into the discharge chamber from the valve stop toward the first discharge outlet in the discharge chamber and may provide fluid communication between the aperture in the valve stop and a location downstream of the valve stop. A first side of the valve member may abut the valve stop when in an open position and the valve stop may provide communication between the first side of the valve member and the communication member via the aperture.

The communication member may include a first end fixed to the valve stop and defining a first opening in fluid communication with the aperture in the valve stop and a second end defining a second opening generally facing the first discharge outlet. The first side of the valve member may be in fluid communication with the second opening and a second side of the valve member opposite the first side may be in fluid communication with a first fluid pressure from the second discharge outlet. The second opening may be in fluid communication with a fluid at a second fluid pressure at the location downstream of the valve stop that is less than the first fluid pressure during compressor operation. The second opening may generally face a direction of fluid flow from the second discharge outlet to the first discharge outlet. The second fluid pressure may be a localized fluid pressure at the second opening from a fluid flow past the second end of the communication member. The second fluid pressure may define a lesser pressure oscillation during compressor operation than the first fluid pressure.

The second end of the communication member may be positioned relative to the first discharge outlet to create a flow restriction therebetween. The second opening of the communication member may be spaced apart from the first discharge outlet. The second opening of the communication member may be located within the first discharge outlet. The second end of the communication member may be located at a maximum fluid flow velocity region of the discharge chamber.

The first and second scroll members may be axially displaceable relative to one another. The scroll compressor may additionally include a bearing housing supported within the shell and supporting the first and second scroll members thereon with the first scroll member being axially displaceable relative to the bearing housing. The communication member may include a generally tubular body forming the fluid passage. The generally tubular body may include a first end fixed to the valve stop in communication with the aperture and a second end opposite the first end and extending generally parallel to a longitudinal axis of the first discharge outlet. The valve stop may be fixed to the partition within the discharge chamber.

In another arrangement, a scroll compressor may include a shell, a partition, a first scroll member, a second scroll member, a drive member and a discharge valve assembly. The shell may include a suction pressure region and a discharge chamber having a first discharge outlet. The partition may be coupled to the shell and may separate the suction pressure region from the discharge chamber. The first scroll member may be supported within the suction pressure region of the shell and may include a second discharge outlet in communication with the discharge chamber. The second scroll member may be meshingly engaged with the first scroll member and the drive member may be engaged with the second scroll member. The discharge valve assembly may include a valve member, a valve stop fixed to the partition and including an aperture therethrough, and a communication member defining a fluid passage extending from the valve stop and including a first end fixed to the valve stop and defining a first opening adjacent to and in fluid communication with the aperture in the valve stop and a second end defining a second opening facing the first discharge outlet. The valve member may be secured between the partition and the valve stop.

The valve stop may be located within a first region of the discharge chamber and the second end of the communication member may be located within a second region of the compressor experiencing a lesser pressure fluctuation during compressor operation than the first region. The valve member may be displaceable between an open position allowing fluid flow from the second discharge outlet to the first discharge outlet and a closed position isolating the second discharge outlet from the first discharge outlet. The valve member may include a first side facing the aperture in the valve stop and abutting the valve stop when in the open position. The first side may be in communication with the second region of the discharge chamber via the communication member and may be isolated from the first region when in the open position. The second end of the communication member may be positioned relative to the first discharge outlet to create a fluid flow restriction and create a lesser pressure fluctuation at the second region relative to the first region.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a section view of a valve assembly shown in FIG. 1;

FIG. 5 is a schematic illustration of an arrangement between a communication member and a discharge fitting according to the present disclosure;

FIG. 6 is a schematic illustration of an alternate arrangement between a communication member and a discharge fitting according to the present disclosure;

FIG. 7 is a schematic illustration of an alternate arrangement between a communication member and a discharge fitting according to the present disclosure;

Corresponding reference numerals indicate corresponding parts throughout the several views of the drawings.

DETAILED DESCRIPTION

Figure 1:
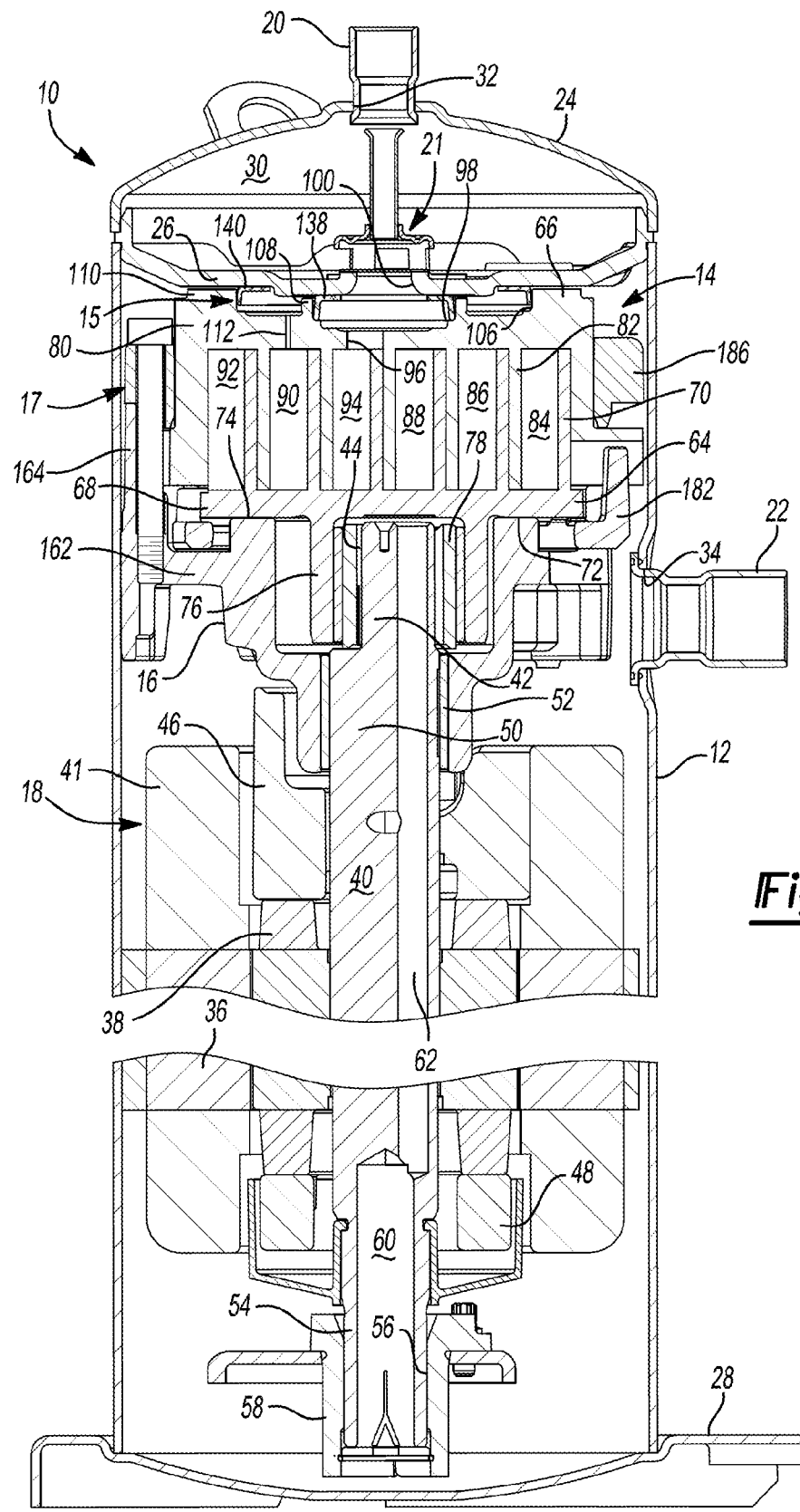
FIG. 1 is a sectional view of a compressor according to the present disclosure.
Figure 2:
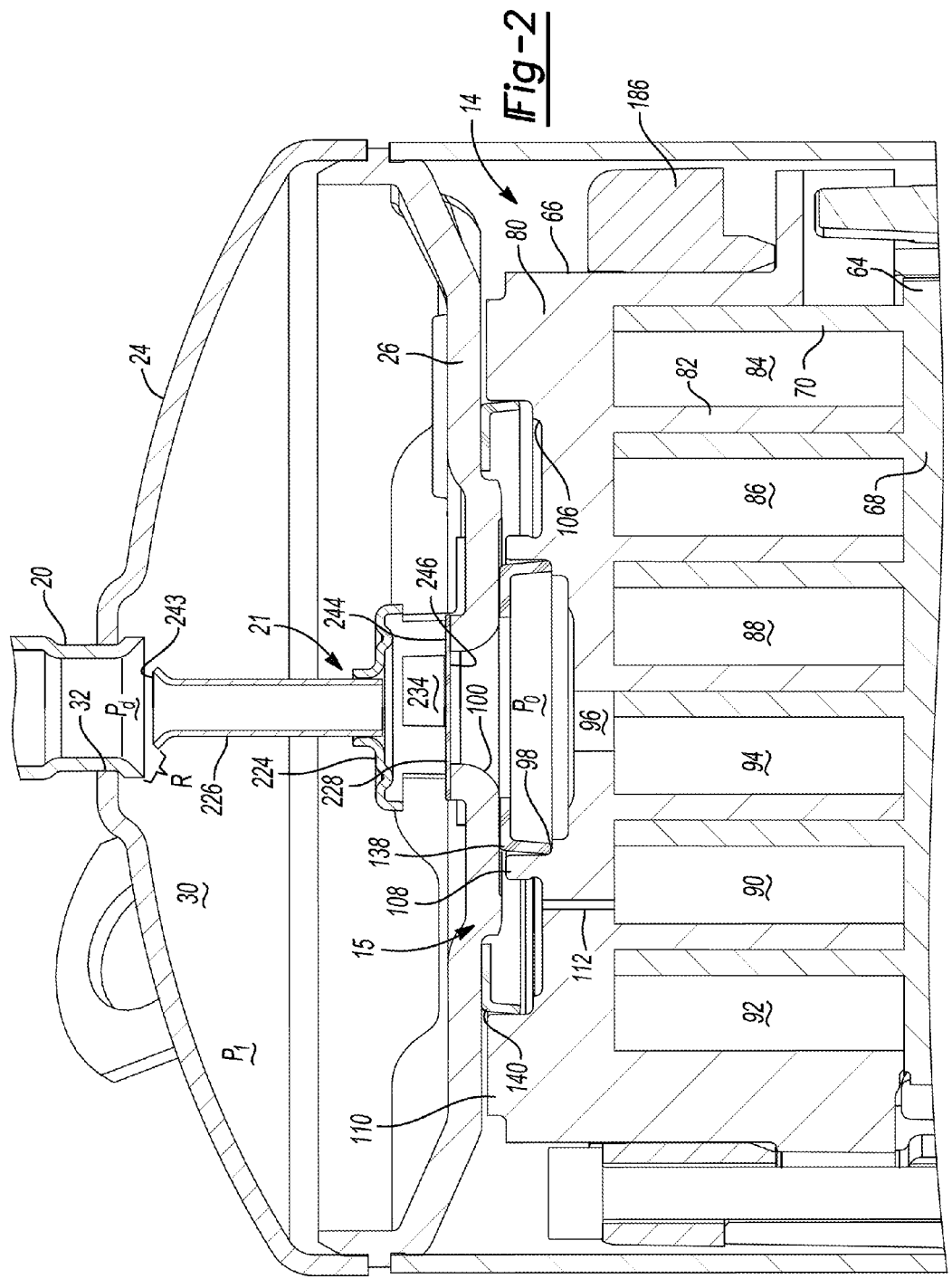
FIG. 2 is a fragmentary section view of the compressor of FIG. 1.
Figure 3:
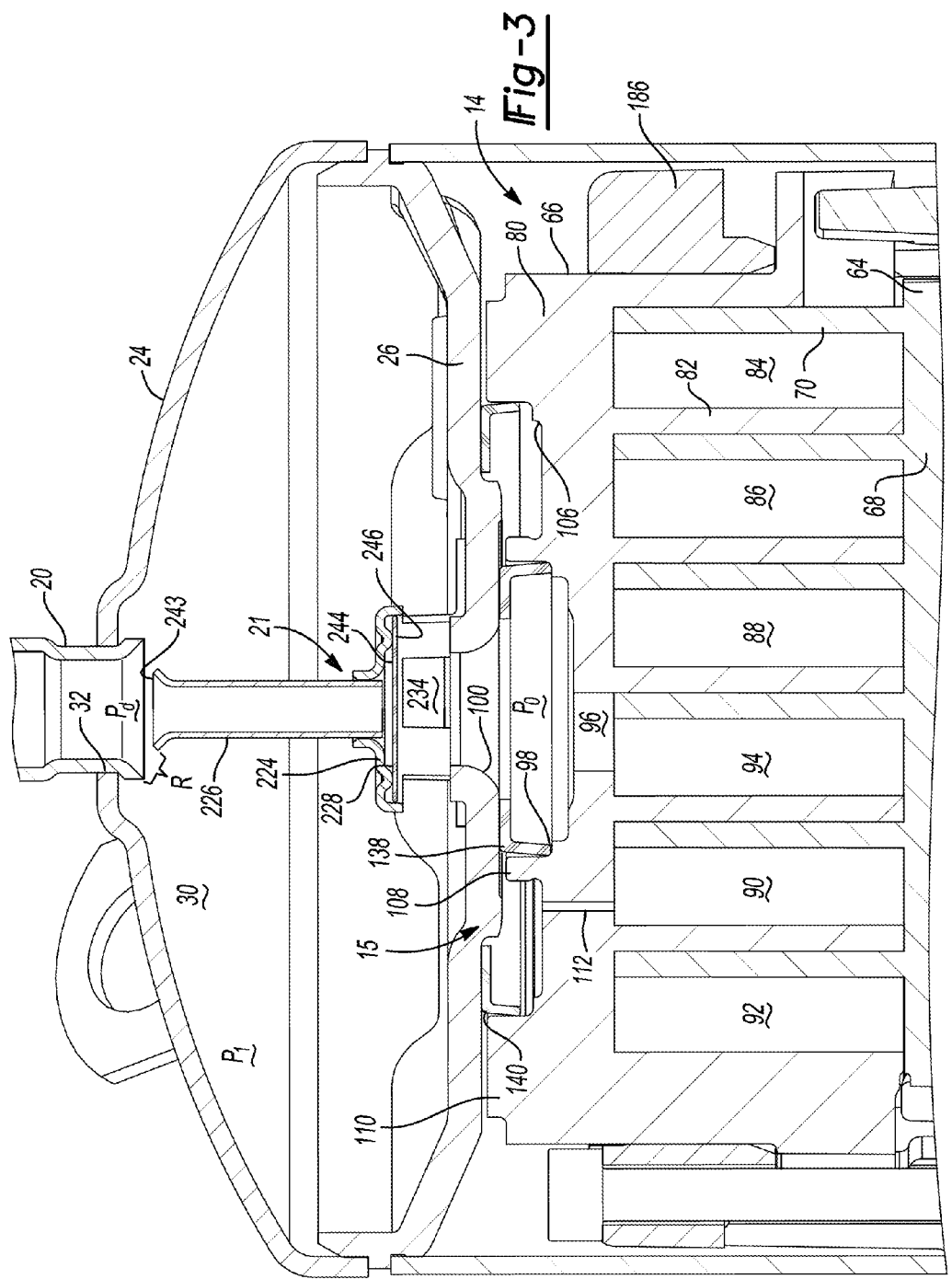
FIG. 3 is a fragmentary section view of the compressor of FIG. 1.

Example embodiments will now be described more fully with reference to the accompanying drawings.

The following description is merely exemplary in nature and is not intended to limit the present disclosure, application, or uses. It should be understood that throughout the drawings, corresponding reference numerals indicate like or corresponding parts and features.

The present teachings are suitable for incorporation in many different types of scroll and rotary compressors, including hermetic machines, open drive machines and non-hermetic machines. For exemplary purposes, a compressor 10 is shown as a hermetic scroll refrigerant-compressor of the low-side type, i.e., where the motor and compressor are cooled by suction gas in the hermetic shell, as illustrated in the vertical section shown in FIG. 1.

With reference to FIG. 1, compressor 10 may include a cylindrical hermetic shell 12, a compression mechanism 14, a seal assembly 15, a main bearing housing 16, a retaining assembly 17, a motor assembly 18, a refrigerant discharge fitting 20, a discharge valve assembly 21, and a suction gas inlet fitting 22. Hermetic shell 12 may house compression mechanism 14, main bearing housing 16, and motor assembly 18. Shell 12 may include an end cap 24 at the upper end thereof, a transversely extending partition 26, and a base 28 at a lower end thereof. End cap 24 and transversely extending partition 26 may generally define a discharge chamber 30. Discharge chamber 30 may generally form a discharge muffler for compressor 10. Refrigerant discharge fitting 20 may be attached to shell 12 at opening 32 in end cap 24. Suction gas inlet fitting 22 may be attached to shell 12 at opening 34. Compression mechanism 14 may be driven by motor assembly 18 and supported by main bearing housing 16. Main bearing housing 16 may be affixed to shell 12 at a plurality of points in any desirable manner, such as staking.

Motor assembly 18 may generally include a motor stator 36, a rotor 38, and a drive shaft 40. Windings 41 may pass through stator 36. Motor stator 36 may be press fit into shell 12. Drive shaft 40 may be rotatably driven by rotor 38. Rotor 38 may be press fit on drive shaft 40.

Drive shaft 40 may include an eccentric crank pin 42 having a flat 44 thereon and upper and lower counter-weights 46, 48. Drive shaft 40 may include a first journal portion 50 rotatably journaled in a first bearing 52 in main bearing housing 16 and a second journal portion 54 rotatably journaled in a second bearing 56 in lower bearing housing 58. Drive shaft 40 may include an oil-pumping concentric bore 60 at a lower end. Concentric bore 60 may communicate with a radially outwardly inclined and relatively smaller diameter bore 62 extending to the upper end of drive shaft 40. The lower interior portion of shell 12 may be filled with lubricating oil. Concentric bore 60 may provide pump action in conjunction with bore 62 to distribute lubricating fluid to various portions of compressor 10.

Compression mechanism 14 may generally include an orbiting scroll 64 and a non-orbiting scroll 66. Orbiting scroll 64 may include an end plate 68 having a spiral vane or wrap 70 on the upper surface thereof and an annular flat thrust surface 72 on the lower surface. Thrust surface 72 may interface with an annular flat thrust bearing surface 74 on an upper surface of main bearing housing 16. A cylindrical hub 76 may project downwardly from thrust surface 72 and may have a drive bushing 78 rotatively disposed therein. Drive bushing 78 may include an inner bore in which crank pin 42 is drivingly disposed. Crank pin flat 44 may drivingly engage a flat surface in a portion of the inner bore of drive bushing 78 to provide a radially compliant driving arrangement.

Non-orbiting scroll 66 may include an end plate 80 having a spiral wrap 82 on a lower surface thereof. Spiral wrap 82 may form a meshing engagement with wrap 70 of orbiting scroll 64, thereby creating an inlet pocket 84, intermediate pockets 86, 88, 90, 92, and an outlet pocket 94. Non-orbiting scroll 66 may be axially displaceable relative to main bearing housing 16, shell 12, and orbiting scroll 64. Non-orbiting scroll 66 may include a discharge passageway 96 in communication with outlet pocket 94 and upwardly open recess 98 which may be in fluid communication with discharge chamber 30 via an opening 100 in partition 26.

Non-orbiting scroll 66 may include an annular recess 106 in the upper surface thereof defined by parallel coaxial inner and outer side walls 108, 110. Annular recess 106 may provide for axial biasing of non-orbiting scroll 66 relative to orbiting scroll 64, as discussed below. More specifically, a passage 112 may extend through end plate 80 of non-orbiting scroll 66, placing recess 106 in fluid communication with intermediate pocket 90. While passage 112 is shown extending into intermediate pocket 90, it is understood that passage 112 may alternatively be placed in communication with any of the other intermediate pockets 86, 88, 92.

Seal assembly 15 may include first and second seals 138, 140. First and second seals 138, 140 may each include an L-shaped cross-section and may sealingly engage partition 26, as described in "Compressor Sealing Arrangement", filed Sep. 9, 2008, U.S. application Ser. No. 12/207,051, the disclosure of which is incorporated herein by reference.

Orbiting scroll 64 and non-orbiting scroll 66 may generally be supported by main bearing housing 16. Main bearing housing 16 may include a radially extending body portion 162 defining thrust bearing surface 74 and a plurality of arms 164 (one of which is shown) extending axially upwardly therefrom. Main bearing housing 16 may be pressed into shell 12 and staked thereto to fix main bearing housing 16 relative to shell 12.

Retaining assembly 17 may include an Oldham coupling 182 and a retaining ring 186, as described in "Compressor with Retaining Mechanism", filed Sep. 9, 2008, U.S. application Ser. No. 12/207,072, the disclosure of which is incorporated herein by reference. Oldham coupling 182 may be engaged with orbiting and non-orbiting scrolls 64, 66 to prevent relative rotation therebetween. Retaining ring 186 may limit axial displacement of non-orbiting scroll 66 relative to main bearing housing 16.

With reference to FIGS. 1-4, discharge valve assembly 21 may include a valve housing 224, a backflow communication member 226, and a valve member 228. Valve housing 224 may be coupled to partition 26 adjacent opening 100 therein. Valve housing 224 may include a valve stop 230 having a series of legs 232 extending axially therefrom and providing an axial offset between opening 100 and valve stop 230. Legs 232 may be circumferentially disposed about valve stop 230, providing openings 234 therebetween. Legs 232 may also circumferentially surround opening 100 in partition 26. Valve stop 230 may include an aperture 236 generally surrounded by an annular ridge 238. Annular ridge 238 may extend axially toward partition 26 and may provide a reduced surface area for engagement with valve member 228, as discussed below.

Figure 9:
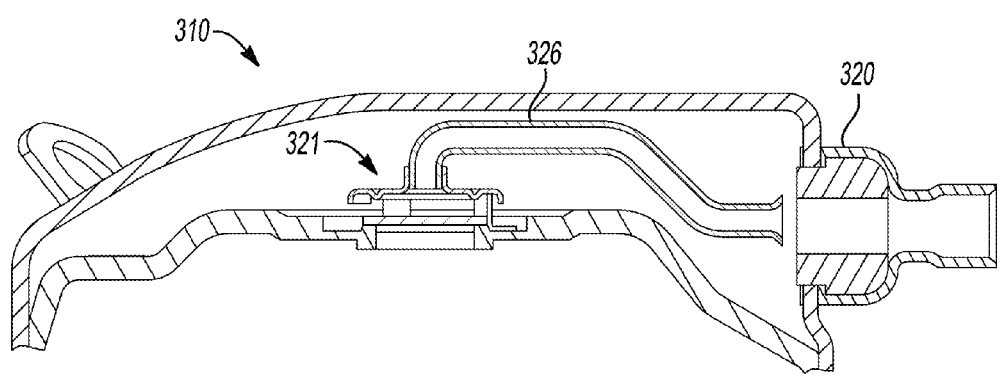
FIG. 9 is a fragmentary section view of an alternate compressor according to the present disclosure.

Backflow communication member 226 may include a generally tubular member extending from valve stop 230 toward discharge fitting 20 and forming a fluid passage therebetween. Backflow communication member 226 may extend generally linearly between discharge passageway 96 and opening 32. Alternatively, a backflow communication member 326 may include a bent body, as discussed below (FIG. 9). Backflow communication member 226 may include a first end 240 coupled to valve stop 230 and providing sealed fluid communication between aperture 236 and a second end 242 of backflow communication member 226 downstream of valve stop 230 proximate discharge fitting 20. More specifically, backflow communication member 226 may have a longitudinal extent that is greater than one-half of the distance between opening 32 in end cap 24 and discharge passageway 96 of compression mechanism 14. Second end 242 of backflow communication member 226 may include an outwardly flared opening 243 generally facing the outlet formed by discharge fitting 20. Second end 242 may extend generally parallel to the longitudinal axis of the opening defined by discharge fitting 20.

Opening 243 may generally face a direction of fluid flow from compression mechanism 14 to discharge fitting 20 during operation of compressor 10. More specifically, second end 242 may be located in a maximum fluid flow velocity region of discharge chamber 30 during operation of compressor 10. Opening 243 may face a direction generally opposite a direction of fluid flow from discharge fitting 20 to compression mechanism 14 during compressor shut-down. Second end 242 of backflow communication member 226 may cooperate with end cap 24 and discharge fitting 20 to isolate second end 242 of backflow communication member 226 from pressure fluctuations by creating a flow restriction (R) upstream of second end 242 during normal operation of compressor 10, as discussed below. Alternatively, or additionally, the fluid flow velocity past second end 242 may isolate opening 243 from pressure fluctuations by creating a localized pressure drop at opening 243.

First, second, and third exemplary arrangements of the relation between discharge fitting 20 and second end 242 of backflow communication member 226 are shown schematically in FIGS. 5-7 for illustration purposes only and have been simplified from the actual geometry of compressor 10. In a first arrangement (FIG. 5), second end 242a of backflow communication member 226a may be disposed within discharge chamber 30a and spaced a distance ($L_1$) from an opening of discharge fitting 20a, generally similar to the arrangement shown in compressor 10. In this arrangement, a restriction ($R_1$) for flow from discharge chamber 30a to discharge fitting 20a may be created by the flow area ($A_1$) defined by the relation between second end 242a of backflow communication member 226a and discharge fitting 20a. For simplicity, an outer diameter ($D_{1a}$) of second end 242a and an inner diameter ($D_{1b}$) of an inlet of discharge fitting 20a are assumed to have similar diameters ($D_1 = D_{1a} = D_{1b}$). The flow area ($A_1$) may then be calculated based on the equation for the surface area of a cylinder having a height ($L_1$) and a diameter ($D_1$), $A_1 = \pi D_1 L_1$. It is understood that second end 242a and an inlet of discharge fitting 20a may have differing diameters, resulting in a flow area corresponding to the surface area of a truncated conical shape, as seen in compressor 10.

In a second arrangement (FIG. 6), second end 242b of backflow communication member 226b may extend outside of discharge chamber 30b and may extend a distance into discharge fitting 20b. The restriction ($R_2$) may then be defined by the minimum flow area ($A_2$) between second end 242b and discharge fitting 20b. In the example shown, second end 242b has an outer diameter ($D_{2a}$) and discharge fitting 20b has an inner diameter ($D_{2b}$). The minimum flow area ($A_2$) may be defined by: $A_2 = \pi(D_{2b}^2 - D_{2a}^2)/4$. The third arrangement (FIG. 7) may be generally similar to the second arrangement. Therefore, the restriction ($R_3$) may be similarly defined. However, in the third arrangement, second end 242c of backflow communication member 226c may be disposed inside of discharge chamber 30c. An inlet of discharge fitting 20c may also extend into discharge chamber 30c and second end 242c of backflow communication member 226c may extend a distance into discharge fitting 20c to form restriction ($R_3$) generally similar to restriction ($R_2$).

The restrictions (R, $R_1$, $R_2$, $R_3$) may generally create a pressure drop relative to discharge chamber 30, as well as a reduction in pressure fluctuation, as discussed below. Restrictions (R, $R_1$, $R_2$, $R_3$) may generally provide isolation for valve member 228, as discussed below.

Valve member 228 may be disposed within legs 232 of discharge valve assembly 21 and between valve stop 230 and partition 26. Valve member 228 may be generally free from a direct connection with valve housing 224 and partition 26. Valve member 228 may be displaceable between first and second positions based on a pressure acting thereon.

More specifically, valve member 228 may be in the form of a disc member having upper and lower surfaces 244, 246. Upper surface 244 may generally face valve stop 230 and lower surface 246 may generally face partition 26. In the second position (FIG. 2), valve member 228 may generally abut partition 26 and overly opening 100 therein, preventing fluid communication between discharge chamber 30 and recess 98. In the first position (FIG. 3), valve member 228 may generally abut annular ridge 238 of valve stop 230, allowing fluid communication between recess 98 and discharge chamber 30. Annular ridge 238 may generally provide a reduced contact area between valve member 228 and stop member 230, resulting in a quicker response time of valve member 228. In the first position, upper surface 244 of valve member 228 may be generally isolated from discharge pressure except as provided from backflow communication member 226 due to its engagement with valve stop 230.

More specifically, during normal operation of compressor 10, the pressure ($P_0$) of discharge gas provided by compression mechanism 14 varies based on the rotational position of drive shaft 40. Pressure ($P_0$) may generally vary between upper and lower limits ($P_{0max}$, $P_{0min}$). The pressure ($P_1$) of discharge gas within discharge chamber 30 may also vary during operation of compression mechanism 14 since discharge gas is provided to discharge chamber 30 directly by compression mechanism 14. However, the volume of discharge chamber 30 may generally damp the pressure fluctuations provided by compression mechanism 14. Additionally, due to system losses, the average pressure ($P_{1AVG}$) in discharge chamber 30 may generally be less than the average pressure ($P_{0AVG}$) of discharge gas provided by compression mechanism 14. The pressure ($P_d$) downstream of restriction (R) may experience fluctuations to a lesser extent than pressure ($P_1$), due to a damping effect of restriction (R). Further, the average pressure ($P_{dAVG}$) downstream of restriction (R) may be less than the average pressures ($P_{0AVG}$, $P_{1AVG}$).

Figure 8:
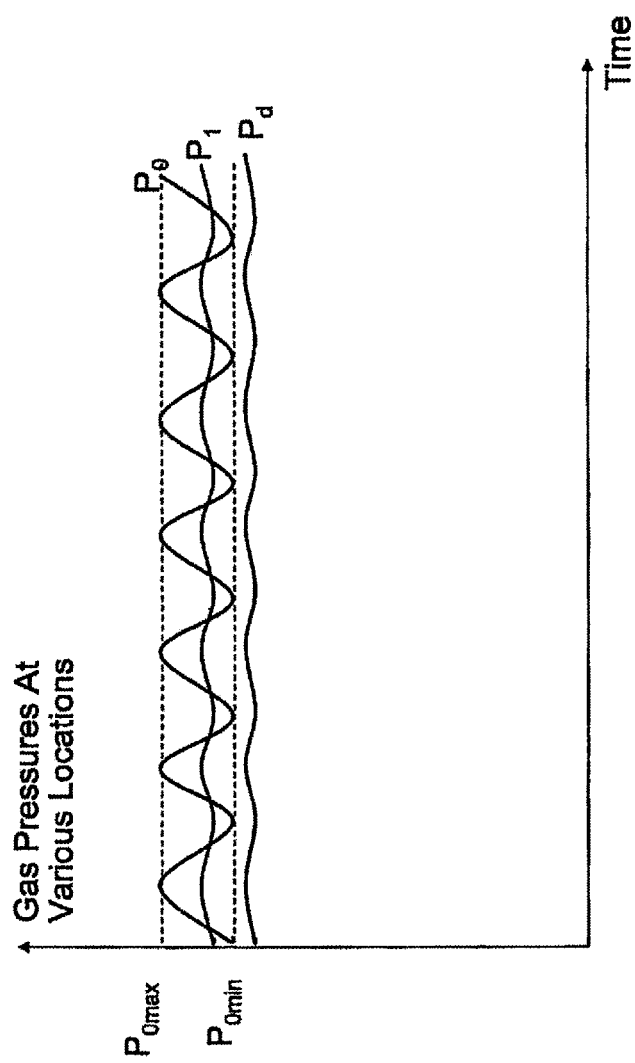
FIG. 8 is a graphical illustration of gas pressures within the compressor of FIG. 1.

The exposure of upper surface 244 of valve member 228 to pressure ($P_d$) may therefore result in an increased stability of valve member 228. More specifically, the reduced fluctuation of pressure ($P_d$) relative to pressures ($P_0$, $P_1$), as well as the reduced average pressure ($P_{dAVG}$) relative to average pressures ($P_{0AVG}$, $P_{1AVG}$), may provide stability in the position of valve member 228 during compressor operation. As seen in FIG. 8, pressure ($P_d$) may remain below minimum values of pressures ($P_0$, $P_1$) resulting from the pressure fluctuations previously discussed. As such, valve member 228 may remain seated against valve stop 230 even during fluctuation of pressures $P_0$, $P_1$.

As seen in FIG. 9, an alternate compressor 310 having a side, or horizontally mounted discharge fitting 320 may include a discharge valve assembly 321 including a bent communication member 326. While communication member 326 is bent to accommodate a side mounted discharge fitting 320, it is understood that the description of discharge valve assembly 21 applies equally to discharge valve assembly 321.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A scroll compressor comprising:
  a shell including a suction pressure region and a discharge chamber having a first discharge outlet;
  a partition coupled to said shell and separating said suction pressure region from aid discharge chamber;
  a first scroll member supported within said suction pressure region of said shell and including discharge outlet in communication with said discharge chamber;
  a second scroll member meshingly engaged with said first scroll member;
  a drive member engaged with said second scroll member; and
  a discharge valve assembly including a valve member, a valve stop fixed to said partition within said discharge chamber including an aperture therethrough, and a communication member defining a fluid passage extending into said discharge chamber from said valve stop toward said first discharge outlet in said discharge chamber and providing fluid communication between said aperture in said valve stop and a location downstream of said valve stop, a first side of said valve member abutting said valve stop when in an open position and said valve stop providing communication between said first side of said valve member and said communication member via said aperture.

2. The compressor of claim 1, wherein said communication member includes a first end fixed to said valve stop and defining a first opening in fluid communication with said aperture in said valve stop and a second end defining a second opening generally facing said first discharge outlet.

3. The compressor of claim 2, wherein said first side of said valve member is in fluid communication with said second opening and a second side of said valve member opposite said first side is in fluid communication with a first fluid pressure from said second discharge outlet.

4. The compressor of claim 3, wherein said second opening is in fluid communication with a fluid at a second fluid pressure at said location downstream of said valve stop that is less than the first fluid pressure during compressor operation.

5. The compressor of claim 4, wherein said second opening generally faces a direction of fluid flow from said second discharge outlet to said first discharge outlet.

6. The compressor of claim 5, wherein said second fluid pressure is a localized fluid pressure at said second opening from a fluid flow past said second end of said communication member.

7. The compressor of claim 6, wherein said second fluid pressure defines a lesser pressure oscillation during compressor operation than said first fluid pressure.

8. The compressor of claim 4, wherein said second end of said communication member is positioned relative to said first discharge outlet to create a fluid flow restriction therebetween.

9. The compressor of claim 8, wherein said second opening of said communication member is spaced apart from said first discharge outlet.

10. The compressor of claim 8, wherein said second opening of said communication member is located within said first discharge outlet.

11. The compressor of claim 4, wherein said second end of said communication member is located at a maximum fluid flow velocity region of said discharge chamber.

12. The compressor of claim 1, wherein said first and second scroll members are axially displaceable relative to one another.

13. The compressor of claim 1, further comprising a bearing housing supported within said shell and supporting said first and second scroll members thereon with said first scroll member being axially displaceable relative to said bearing housing.

14. The compressor of claim 1, wherein said communication member includes a generally tubular body forming said fluid passage.

15. The compressor of claim 14, wherein said generally tubular body includes a first end fixed to said valve stop in communication with said aperture and a second end opposite said first end and extending generally parallel to a longitudinal axis of said first discharge outlet.

* * * * *

UNITED STATES PATENT AND TRADEMARK OFFICE
CERTIFICATE OF CORRECTION

| | | |
|---|---|---|
| PATENT NO. | : 8,668,478 B2 | Page 1 of 1 |
| APPLICATION NO. | : 13/155021 | |
| DATED | : March 11, 2014 | |
| INVENTOR(S) | : Xiaogeng Su et al. | |

It is certified that error appears in the above-identified patent and that said Letters Patent is hereby corrected as shown below:

On the Title page (*) Notice, line 3        After "days.", insert --This patent is subject to a terminal disclaimer.--.

In the Specification

Column 5, Line 45        Delete "326" and insert --226--.

In the Claims

Column 7, Line 67        In Claim 1, delete "aid" and insert --said--.
Column 8, Line 2        In Claim 1, after "including", insert --a second--.
Column 8, Line 10        In Claim 1, after "chamber", insert --and--.

Signed and Sealed this
Twenty-first Day of July, 2015

Michelle K. Lee
*Director of the United States Patent and Trademark Office*